INVENTOR.
ALFONSO S. ESCOBOSA

ATTORNEY

United States Patent Office 3,424,990
Patented Jan. 28, 1969

3,424,990
SYNCHRONOUS DEMODULATING MEANS
Alfonso S. Escobosa, Placentia, Calif., assignor to North American Rockwell Corporation, a corporation of Delaware
Filed Dec. 9, 1964, Ser. No. 417,148
U.S. Cl. 329—50                8 Claims
Int. Cl. H03d 3/18

ABSTRACT OF THE DISCLOSURE

The invention comprises a synchronous demodulator utilizing an amplitude modulated square wave carrier and four electronic switching valves. Each pair of valves are connected together by first electrodes to form a pair of input terminals for a source of A-C signals. Each pair of valves are further connected together by different electrodes to form a pair of output terminals. Control electrodes of alternate valves of each pair are connected together to form a pair of switching terminals adapted to be connected to a source of switching signals. By the above described arrangement, an A-C carrier input terminal is switched across alternate ones of the output terminals in synchronism with changes in sense of switching signals. Where the carrier is used as the source of switching signals, demodulation of the modulated carrier occurs at the output terminals.

---

This invention relates to signal demodulating means, and more particularly to synchronously switched signal conversion means.

In many measurement and control functions it is necessary to convert an A-C carrier signal to a D-C signal, and to reconvert the D-C signal back to A-C again. In a positional servo system or closed loop controller, for example, it may be necessary to convert the amplitude-modulated A-C carrier signal, provided by a high-resolution A-C position feedback transducer, to D-C for use by an electrohydraulic actuator or other D-C utilization means.

Again, in an A-C servo system, required system stabilization or compensation may necessitate recovery of the modulation envelope of the modulated carrier for compensatory signal shaping by D-C networks, and then restoration of the carrier to the compensated envelope.

The performance of control systems using prior art modulator-demodulator devices for such functions have suffered from the relatively large insertion losses inherent in such conventional networks. Further, because such devices have relied on sinusoidal carriers, signal distortion results due to limiting by a diode circuit or the saturation of an amplifier. Moreover, the response of A-C servo systems relying on such sinusoidal carriers is adversely affected by carrier phase shift or quadrature signal components inherent in sinusoidal carrier systems.

Such prior art sinusoidal carrier systems have comprised open-loop data-sampling type devices (in the manner of half-wave rectifiers) and highly-tuned amplifiers, tuned to the carrier frequency. An L-C type wave-shape restorer is interposed between the data sampler and the tuned amplifier to restore the sinusoidal wave shape, after performance of frequency-sensitive shaping of the envelope of the half-wave signal.

The half-wave envelope (in the absence of the waveshape restorer) acts to bias or vary the operating point of the tuned amplifiers, thereby restricting or limiting the useful signal swing of the amplifier (i.e., the amplifier saturates more easily). The necessity of wave-shape restorers to remove the variable bias at the envelope frequencies, requires highly-tuned L-C circuits which, however, are highly susceptible to variable phase-shifts coincident with differences between the carrier frequency and tuned frequency, due to drift in the carrier frequency, component tolerances or component aging. Associated with such resultant phase shift is a corresponding attenuation (or insertion loss) of the shaped enveloped which is recovered, as is understood in the art.

Further, the open-loop nature of such prior art data-sampling systems restricts or limits the kinds of frequency-sensitive shaping of the envelope which can be conveniently effected. Moreover, the sampled-data performance of such prior art systems suffers an inherent transport lag or time delay characteristic of sampled data systems, thereby providing stability problems in closed loop applications of such prior art devices. Additionally, such open-loop sampled-data type prior art device is sufficiently complex as to be somewhat unreliable; and, further, such open-loop nature makes the device unsuited to redundant combinations thereof for improving system reliability.

By means of the concept of the subject invention, the above recited disadvantages of the prior art may be avoided. It has been discovered that, where a square wave type carrier is used, synchronous switching of an A-C signal across a two-terminal network impedance causes such impedance to present an admittance to the envelope of the modulated carrier which is identical to that presented to a D-C (low frequency) signal. Accordingly a concept of the invention relates to the use of synchronous demodulation means in combination with a square wave type carrier system.

In a preferred embodiment of the invention, there is provided synchronous demodulating means for use with an ampiltude modulated square wave carrier system, and comprising first, second, third, and fourth electronic switching valves, each valve having a first and second conductive electrode and a third switching control electrode. Corresponding first electrodes of the first and second valves are interconnected and corresponding first electrodes of the third and fourth valves are interconnected to form a respective first and second input terminals adapted to be connected to a source of A-C signals. Corresponding second electrodes of the first and third valves are interconnected and corresponding second electrodes of the second and fourth valves are interconnected to form respective first and second output terminals adapted to be connected across a D-C load impedance. The control electrodes of the first and fourth valves are interconnected and the control electrodes of the second and third valves are interconnected to form respective first and second switching terminals adapted to be connected across a center tapped source of switching signals.

By means of the above described arrangement, an A-C carrier input terminal is switched across alternate ones of the output terminals in synchronism with changes in sense of the switching signals. Where the A-C carrier itself is used as the source of switching signals, demodulation of the modulated carrier occurs at the output terminals of the device. In other words, the device operates in the manner of a double-pole double-throw switch, the armatures of which are connected to a source of the amplitude modulated A-C carrier signal, and having cross-connected switching terminals connected across a D-C impedance, the armatures being switched to alternate switching states in synchronism with the half-cycle periodicity of the carrier signal.

Such arrangement provides an appreciable reduction in the size and complexity of demodulated A-C carrier systems. Also the reduced complexity provides improved reliability and decreased insertion losses. Further, where employed with a square wave carrier system, the carrier wave form is not distorted as a result of limiting by a diode circuit or by the saturation of an amplifier. Moreover, where employed with a square wave carrier, the device avoids the problems associated with carrier phase-shift or quadrature of sinusoidal A-C carrier systems. Accordingly, it is an object of the subject invention to provide improved demodulating means for an A-C system.

It is another object of the subject invention to provide demodulating means employing a square wave carrier.

It is yet another object of the invention to provide synchronous switching means cooperating with an A-C carrier system for processing the envelope of said carrier.

It is a further object of the subject invention to provide a synchronously switched signalling system employing a square wave carrier for providing improved demodulation response.

It is still a further object of the invention to provide synchronous switching means of a reduced size, reduced complexity and having improved performance.

These and other objects of the invention will become apparent from the following description taken together with the accompanying drawings in which.

In the figures like reference characters refer to like parts.

Figure 1:
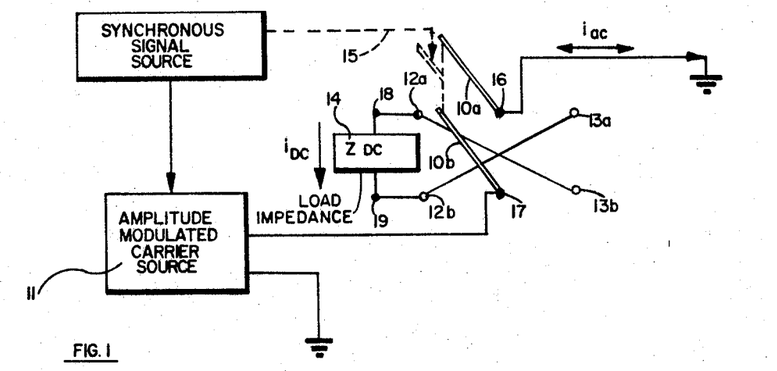
FIG. 1 is a schematic representation of a double-pole, double throw switching arrangement for synchronous switching of an amplitude modulated A-C carrier.

Referring now to FIG. 1, there is illustrated a schematic representation of a double-pole double-throw switching arrangement for synchronous switching of an amplitude modulated A-C carrier. There is provided first and second armature means 10a and 10b adapted to be connected to a two-terminal amplitude modulated carrier source 11, each armature means having a first and second pair of switching terminals 12a, 12b and 13a, 13b associated therewith and corresponding to a first and second state of the double throw switching means. A first switching terminal associated with each armature is interconnected with a second switching terminal of the other of the armature means, the pair of first terminals 12a and 12b being adapted to be connected across a D-C load impedance 14. In other words, first terminal 12a is interconnected with second terminal 13b, and first terminal 12b is interconnected with second terminal 13a, first terminals 12a and 12b being further connected across impedance 14. There is further provided switch actuation means 15 for alternately switching the double throw switch from one to the other of its two switching states in synchronism with the half cycle periodicity of the applied A-C signals.

Such synchronous switching arrangement of FIG. 1 may be alternatively described as double-pole double-throw switching means having cross-connected switching terminals adapted to be connected to a D-C load impedance, and further having a pair of armatures adapted to be connected to a source of an amplitude modulated A-C signal.

Figure 2:
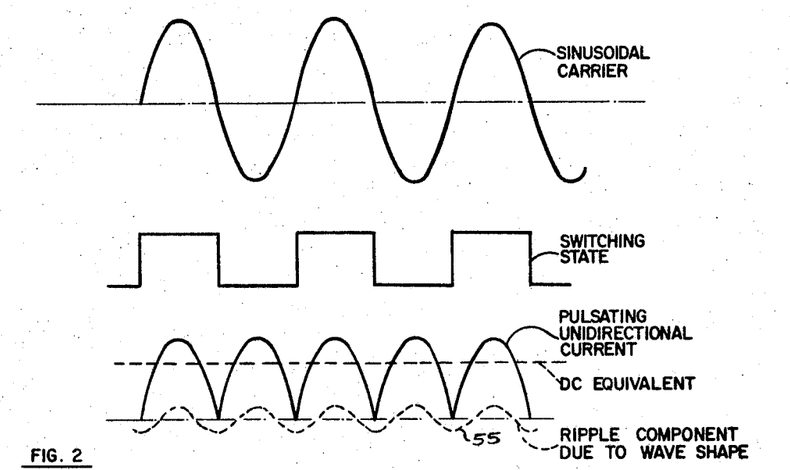
FIG. 2 is a family of time-histories illustrating the effect of a sinusoidal carrier upon the demodulation function performed by the schematic synchronous switching arrangement of FIG. 1 in cooperation with a representative D-C utilization impedance.

When the switching arrangement of FIG. 1 is switched from one to the other of its two switching states in synchronism with the half-cycle periodicity of an A-C carrier signal applied across the armatures 12a and 12b thereof, it is apparent that the amplitude modulation envelope of the A-C carrier will be recovered or applied (in attenuated form) across the D-C load impedance 14, together with an A-C ripple component occurring as a function of the carrier wave shape, as shown in FIG. 2. In other words, the polarity of the D-C impedance coupling is reversed in synchronism with the reversals of the A-C signal, whereby a pulsating unidirectional current flows through the synchronously switched load impedance.

Figure 3:
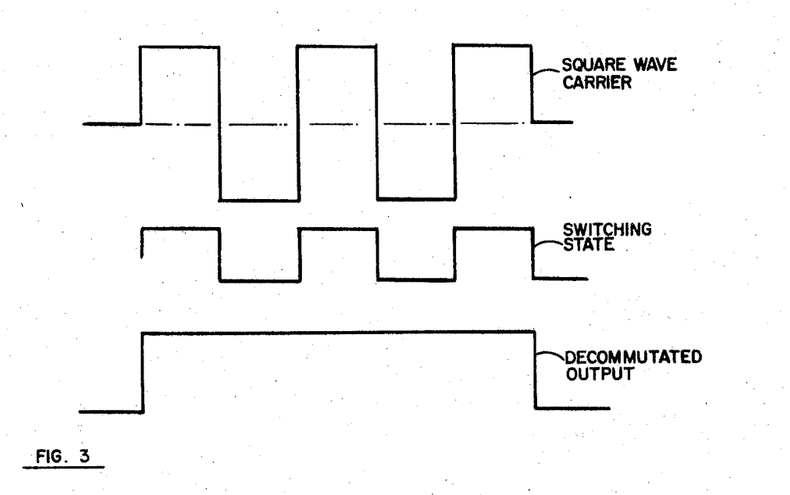
FIG. 3 is a family of time histories illustrating the effect of a square wave carrier upon the demodulation function performed by the schematic synchronous switching arrangement of FIG. 1.

Where, however, a square wave carrier is employed in cooperation with the synchronous switching arrangement of FIG. 1, then the amplitude modulation is recovered without the occurrence of any attenuation as shown in FIG. 3.

Figure 4:
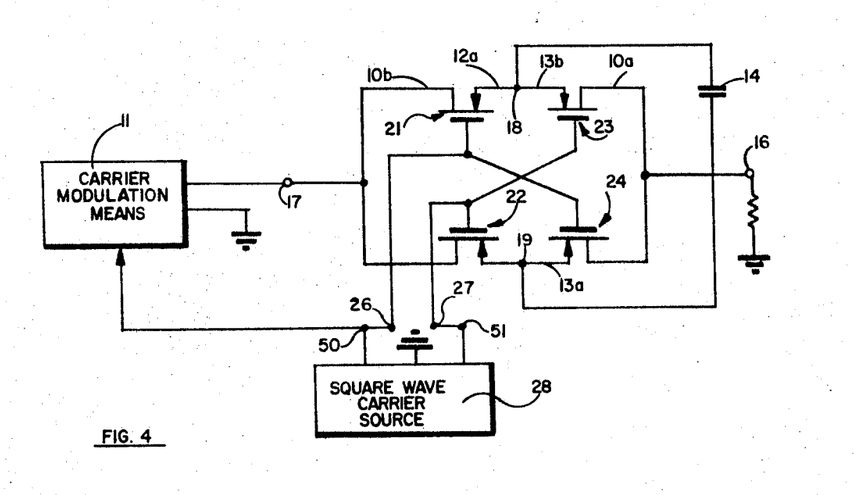
FIG. 4 is a preferred embodiment of the synchronous arrangement of FIG. 1.

A preferred embodiment of the schematic arrangement is shown in FIG. 4.

Referring to FIG. 4, there is illustrated a schematic circuit of a preferred embodiment of one concept of the invention. There is provided a double-pole double-throw switching device comprising four electronic switching valves 21, 22, 23 and 24, each comprising a first, and second conductive electrodes and a third switching control electrode. Valves 21, 22, 23 and 24 are similarly constructed and arranged and may be comprised of field effect transistors or similar commercially available high speed electronic switching valves. Corresponding first electrodes of the first and second valves 21 and 22 are interconnected and corresponding first electrodes of the third and fourth valves 23 and 24 are interconnected to form respective first and second input terminals 16 and 17 connected across a source 11 of an amplitude modulated carrier. Corresponding second electrodes of the first and third valves 21 and 23 are interconnected and corresponding second electrodes of the second and fourth valves 22 and 24 are interconnected to form respective first and second output terminals 18 and 19 connected across a D.C. load impedance 14. The control electrodes of the first and fourth valves 21 and 24 are interconnected and the control electrodes of the second and third valves 22 and 23 are interconnected to form respective first and second switching control terminals 26 and 27 connected across a source 28 of switching signals for switching the arrangement in synchronism with the half-cycle periodicity of the A.C. signals applied to the A.C. input terminals 16 and 17.

Figure 11:
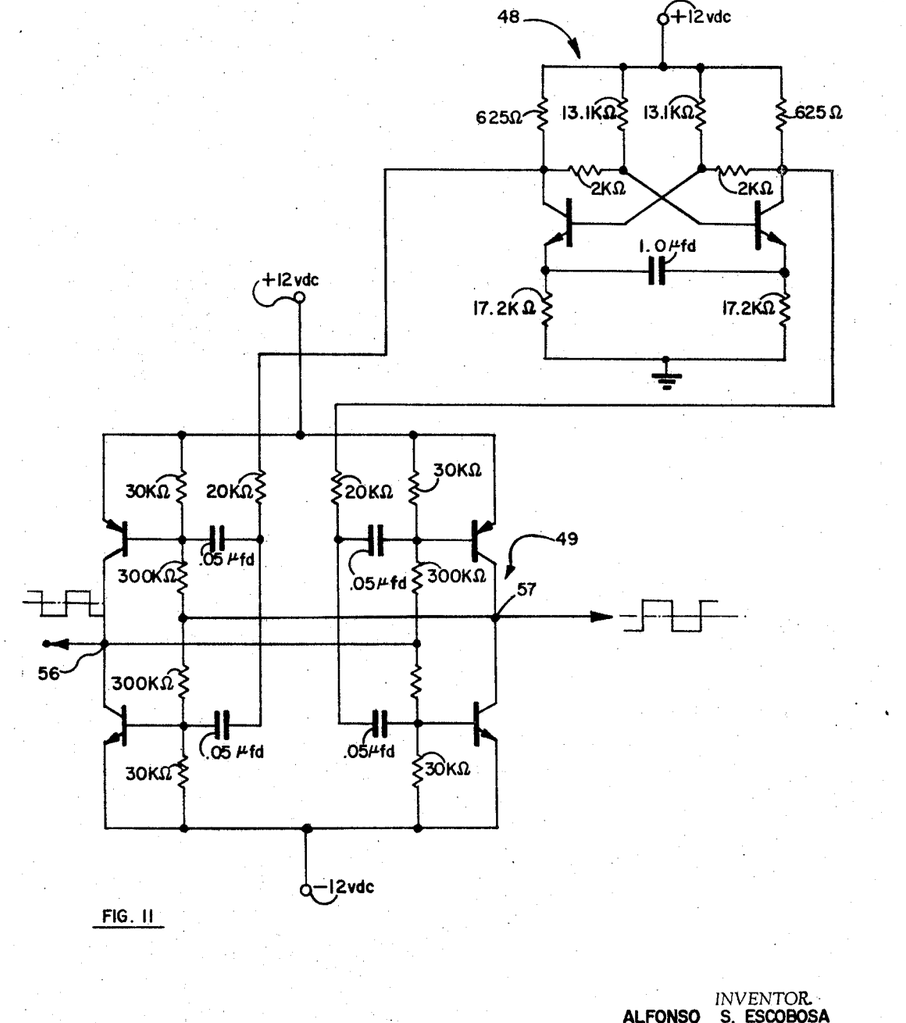

The particular form of square wave carrier source 28 is not critical, a number of circuits being known for providing such function, an exemplary circuit arrangement, including indicated circuit parameter values for a 400 c.p.s. system, being shown in FIG. 11. The arrangement of FIG. 11 comprises a nonsaturating astable multivibrator or other form of low power oscillator 48, in cooperation with a complimentary type power flip-flop 49 having output terminals 56 and 57, for providing respective mutually synchronous square wave outputs of mutually opposite polarity. Where power requirements dictate, each of the indicated transistor stages may employ a plurality of transistors arranged as a power amplifier, as is well understood in the art.

In operation of the above described arrangement of FIG. 4, the periodic two-stage switching signals applied across the switching control terminals 26 and 27 cause a first valve pair 21 and 24 and a second valve pair 22 and 23 to be alternately conductive in synchronism with the half cycle periodicity of the applied D.C. signal on terminal 26, whereby a unipolar potential is applied across D.C. impedance 14. Thus, when the first valve pair 21 and 24 is conductive, first output terminal 18 is connected through valve 21 to A.C. input terminal 17, and second output terminal 19 is connected through valve 24 to ground for a given half cycle of the applied A.C. signal on terminal 17. When the second valve pair 22 and 23 is conductive on the alternate half cycle, first output terminal 18 is connected through valve 23 to ground, and second output terminal 19 is connected through valve 22 to input terminal 17.

In other words, the interconnected first electrodes of the first and second valves 21 and 22 of FIG. 4 correspond to second armature 10b of FIG. 1, the interconnected first electrodes of the third and fourth valves 23 and 24 correspond to first armature 10a of FIG. 1, the interconnected second electrodes of the first and second valves 21 and 22 and the interconnected electrodes of the third and fourth valves 23 and 24 correspond to the cross-connected switching terminals of FIG. 1.

Although first terminal pair 16 and 17 has been indicated as an A.C. input terminal pair, and second terminal pair 18 and 19 indicated as being a D.C. output terminal pair, it is clear that the device will operate equally well with such functions interchanged, whereby terminals 18 and 19 are connected across the A.C. source, and terminals 16 and 17 are connected across the D.C. load impedance. Further, because of the closed loop of the symmetry of the arrangement of the switch in FIG. 4, switching transients tend to circulate within the switching circuit itself and to be self cancelling, whereby such transients are not manifested in the circuits external of the switch.

Figures 5, 6:
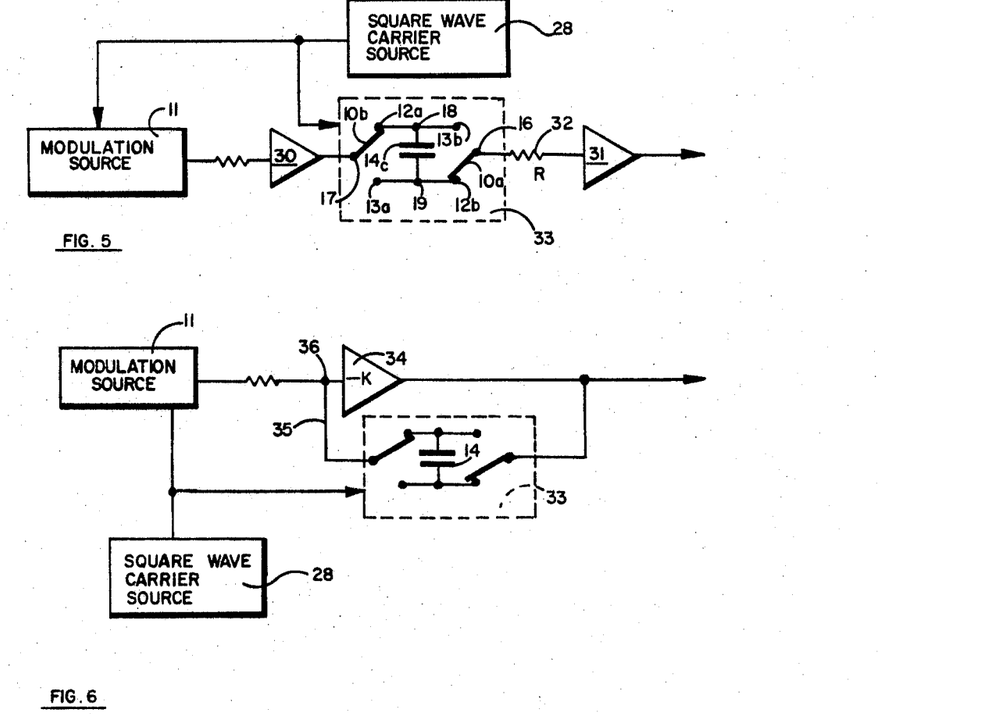
FIGS. 5, 6 and 7 are schematic diagrams illustrating a respective differentiator, integrator and bandpass device, all employing the concept of the invention.
Figure 7:
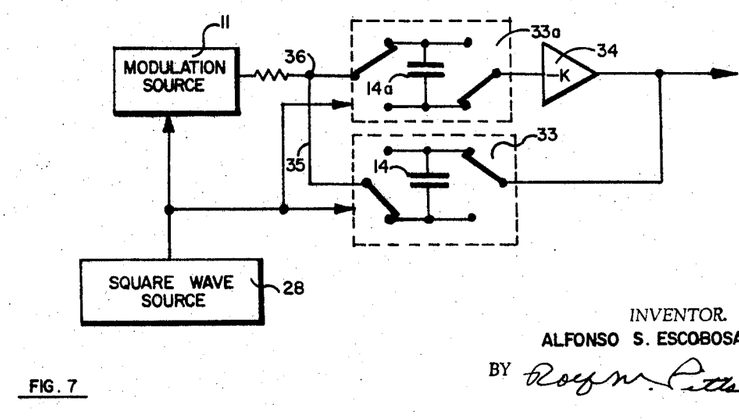

Because a frequency sensitive impedance connected across the output terminals 18 and 19 of the synchronous switch of FIG. 4 presents an admittance to the envelope of the modulated carrier which corresponds to that presented to a D.C. or low frequency signal having a like spectra as such envelope, such combination of a synchonous switch and frequency-sensitive impedance may be employed to effect compensation or signal-shaping of the envelope of an A.C. carrier as a function of the spectral content of the modulation and independent of the carrier frequency itself, as shown in FIGS. 5, 6 and 7.

Referring to FIGS. 5, 6 and 7, there are severally illustrated a respective lead time constant or differentiator circuit, lag constant or integration circuit, and bandpass circuit, the indicated functions for each circuit referring to functions performed upon the modulation envelope (of an A.C. carrier) or portions of the spectrum thereof. Referring more particularly to FIG. 5, for example, there is illustrated first and second wide band D.C. amplifiers 30 and 31 connected in tandem with the output of a source 11 of a modulated carrier. Interposed between amplifiers 30 and 31 is an input resistor 32 and a synchronous switch 33 constructed and arranged to cooperate with a carrier source 28 substantially the same as the switching arrangement of FIG. 4, and having a capacitor cooperating as a frequency sensitive load impedance 14 connected across terminals 18 and 19 thereof. Because of the commutative action of switch 33, the frequency sensitive impedance 14 is sensitive to the spectra of the modulation envelope of the signal from modulation source 11, and not to the carrier frequency thereof, whereby the A.C. signal is shaped or modified in accordance with the transfer function or R–C lead time constant presented to the modulation envelope by the cooperation of frequency sensitive impedance 14 and resistor 32. In other words, the open-loop arrangement of FIG. 5 tends to provide lead-compensation or differentiation of the envelope of an A.C. carrier signal.

For example, where the output of source 11 is an A.C. carrier signal having a fixed amplitude, such D.C. envelope or amplitude component would be blocked from the input of amplifier 31 by the D.C. blocking action of capacitor 14c. Also, where a sinusoidal type carrier is used, a carrier frequency component (corresponding to curve 55 of FIG. 2) would be generated at the output of amplifier 31 as a function of the fixed amplitude. However, where a square wave carrier is employed, such ripple component in the commutated output is avoided (as shown in FIG. 3), whereby a proper null input signal is provided to amplifier 31, corresponding to the true derivative or rate of change of the fixed amplitude of an applied fixed amplitude carrier signal.

Improved integration of the amplitude of an A-C carrier can similarly be achieved by synchronously switching a capacitor 14 in the feedback path 35 of the high-gain phase-inverting feedback amplifier 34 shown in FIG. 6. Because of the phase-inversion provided by amplifier 34, negative feedback is provided as to tend to oppose an applied A-C input (from source 11). Such opposition or negative feedback signal is decreased as the frequency of the modulation envelope decreases, due to the increased attenuation provided by commutative capacitor 14 as such frequency decreases. Accordingly, the output of amplifier 34 increases as the frequency of the modulation envelope (of an applied carrier signal) decreases. Because of the D-C blocking action of capacitor 14 to the D-C component representing a fixed amplitude envelope, no opposing feedback voltage is applied on line 35 in response to a fixed amplitude, resulting in a maximum output from amplifier 34. In other words, the increasingly attenuated response of amplifier 34 to higher frequencies of a modulation envelope of an A-C carrier describes the transfer function of an analog integrator of such envelope. Accordingly, the cooperation of elements 14, 33, 34 and 35 of FIG. 6 provide integration of the modulation envelope of an A-C carrier.

By interposing another commutative or synchronously switched capacitor between the feedback summing point 36 and the input to amplifier 34 of FIG. 6, a bandpass filter function may be achieved, as shown in FIG. 7.

Referring to FIG. 7, there is illustrated the arrangement of FIG. 6 with the addition of a synchronous switch 33a interposed between summing point 36 and the input of phase-inverting amplifier 34, and having a capacitor 14a connected across the commutated output terminals thereof. By means of such arrangement, the D-C blocking action of commutated capacitor 14a prevents an input to amplifier 34, in response to an A-C carrier having a fixed modulation envelope or a constant amplitude. Therefore, a null amplitude A-C output signal occurs at the output of amplifier 34 in response to a fixed amplitude, square wave A-C carrier input from source 11.

Further, for a modulation envelope of high frequency (particularly frequencies approaching that of the carrier frequency), at which the capacitors 14 and 14a provide little or no attenuating action, the negative feedback arrangement of amplifier 34 provides an extremely attenuated A-C carrier output similar to the performance of the arrangement of FIG. 6. At intermediate frequencies, the increased attenuating action of commutated feedback capacitor 14 (relative to that at high frequencies) coupled with the decreased blocking action of commutated input capacitor 14a (relative to that at D-C or low modulation frequencies of the modulation envelope) cooperates to provide a higher amplitude A-C carrier output signal at the output of amplifier 34. In other words, the arrangement of FIG. 7 combines the high frequency attenuating response of the integrator of FIG. 6 and the low frequency blocking response of the differentiator of FIG. 5 to provide a bandpass filter response to an A-C carrier having a modulation envelope which is within a selected bandpass.

Figure 8:
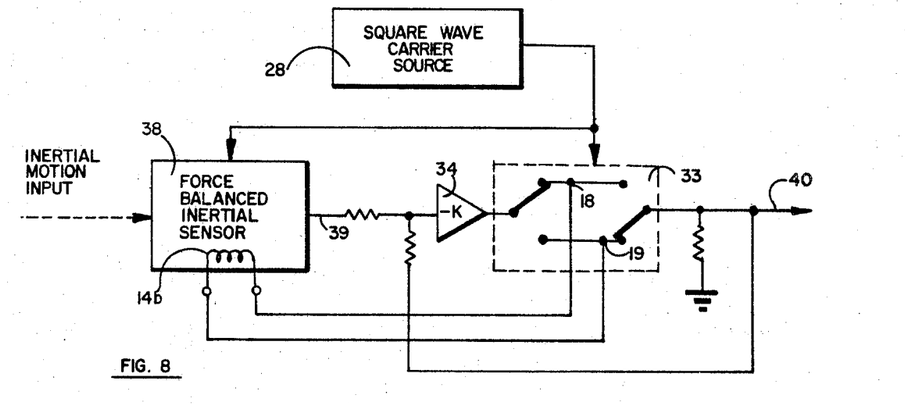
FIG. 8 is a block diagram of a force rebalanced inertial sensor employing the inventive concept.

Another practical closed loop application of the device of FIG. 4 is in cooperation with a force rebalance type inertial sensor, as shown in FIG. 8.

Referring to FIG. 8, there is illustrated in block form a force rebalanced inertial sensor 38 such as a magnetically torqued accelerometer having a torquing coil 14b and having a capacitive-type A-C pickoff (not shown) for providing a high-resolution A-C output signal on output line 39. Such accelerometers are well known in the art, being described for example in U.S. Patent 3,204,466, issued to F. B. Henderson for Force Rebalanced Instrument. Therefore, element 38 is shown in block form only. There is also provided a high gain, phase-inverting A-C summing amplifier having a first input coupled to the A-C output 39 of accelerometer 38, and further having a second (negative feedback) input responsively connected to the output of amplifier 34.

Interposed between the output of amplifier 34 and the feedback connection thereto is a commutatively switched impedance including synchronous switch 33 in cooperation with a D-C load impedance 14b comprising D-C torquing means. By means of the commutative action of switch 33 upon the A-C output of element 34, which is applied to impedance 14b, impedance 14b is excited with a unidirectional current the sense of which corresponds to the phase sense of the modulated A-C output on line 39. By properly selecting the relative polarity of the connection of impedance 14b across the commutated output terminals 18 and 19 of switch 33, impedance 14b is made to cooperate with accelerometer 38 in closed loop fashion to recenter or force-balance an inertially responsive element thereof, as is understood in the inertial instrument art.

Because of the feedback cooperation of amplifier 34, the gain of such arrangement is made less sensitive to drifts in the gain performance of amplifier 34 itself due to aging of amplifier components, as is well understood in the art of feedback circuits. Therefore, the A-C signal on line 40, indicative of a sensed acceleration, is less subject to calibration errors.

Figure 9:
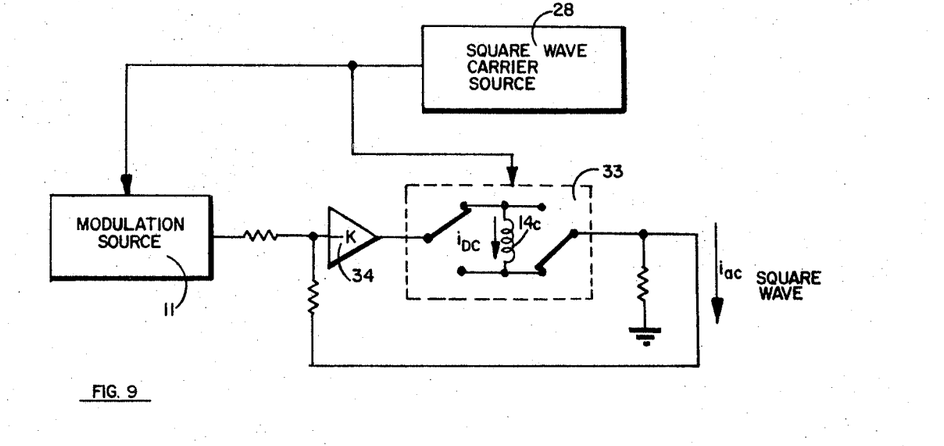
FIG. 9 is a schematic arrangement illustrating the application of the inventive concept to a D-C controlled element.

In a further closed loop application of the arrangement of FIG. 4, the source 11 of an A-C input signal may comprise carrier modulation means such as an A-C excited, inductive position feedback transducer of a positional servo, and the D-C load impedance 14c may be the flow control valve of an electrohydraulic actuator which is controlled in accordance with the phase-sense and amplitude of the envelope of a modulated carrier signal, as shown in FIG. 9. Further, the device of FIG. 4 may be employed in a redundant arrangement to achieve improved reliability in a signal translating system, as shown in FIG. 10.

Figure 10:
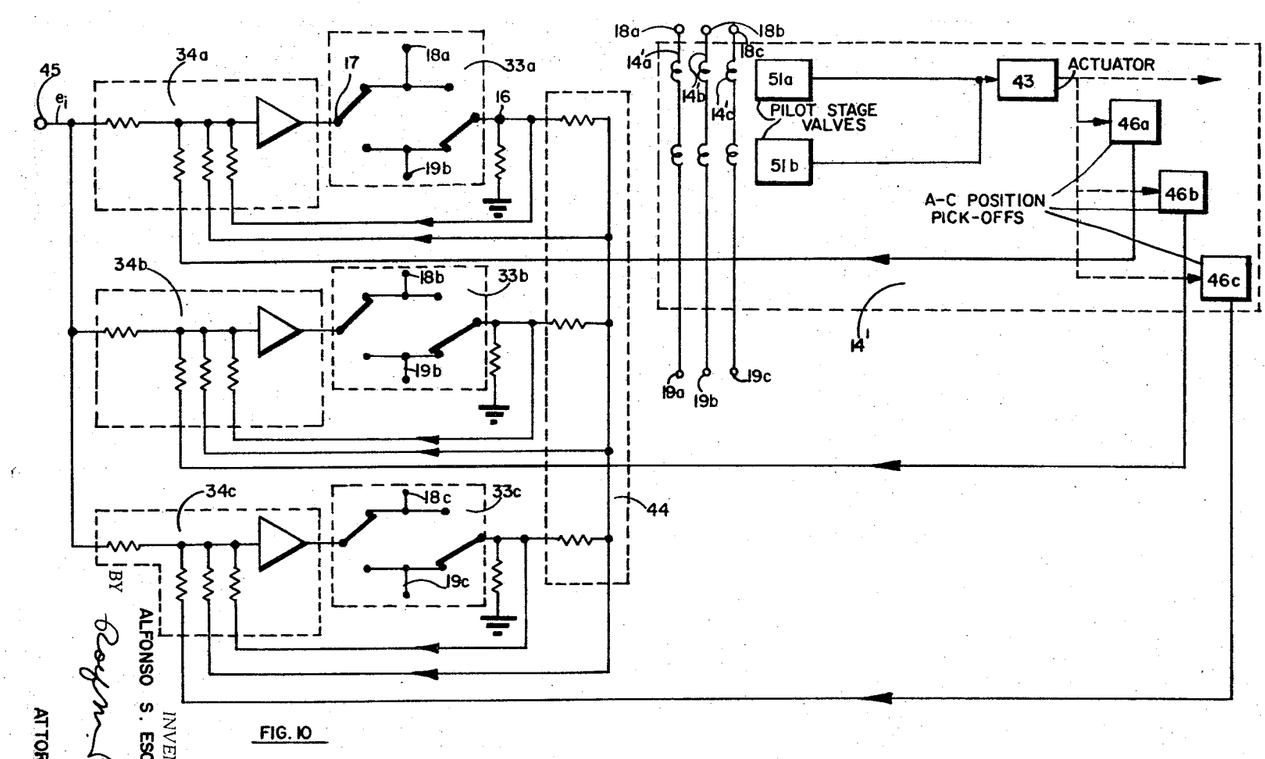
FIG. 10 is a schematic diagram of another concept of the invention and employing the device of FIG. 4; and, FIG. 11 is a schematic circuit of an exemplary square wave carrier source.

Referring to FIG. 10, there is illustrated a schematic diagram of another concept of the invention and employing the device of FIG. 4. There is provided D-C actuated means such as for example, an electrohydraulic actuator 43 and having a plurality of at least three D-C input impedances 14'a, 14'b and 14'c, and arranged for being actuated by the D-C excitation of any one or any combination of the input impedances. Such a combination is shown, for example, in Application Ser. No. 399,454, filed Sept. 28, 1964, by Clarence W. Asche, and now U.S. Patent 3,279,323. There is also provided a first signal summing means 44, and a like plurality of phase-inverting A-C signal summing amplifiers 34a, 34b and 34c as the input impedances of the electrohydraulic actuator, a first input of each amplifier being commonly connected to form a common input terminal 45 adapted to be connected to a source of an A-C signal having a selected carrier frequency (not shown).

There is further provided a like plurality of synchronously switched demodulating means 33 as the phase-inverting amplifers 34a, 34b and 34c, each synchronous switched means corresponding to the double-pole double-throw switching device of FIG. 4 in construction and arrangement. Therefore, the demodulating means are shown in simplified schematic form only in FIG. 5. The cross-connected switching terminals 18 and 19 of each switch are connected across a mutually exclusive one of the D-C impedances 14'a, 14'b and 14'c. A first switched terminal 17 of each switched device is connected to an output of a mutually exclusive one of the inverting amplifiers, and a second armature terminal 16 is connected to a mutually exclusive input of the first summing means 44 and to a second input of an associated one of the phase-inverting amplifiers 34a, 34b and 34c. A third input of each of the phase inverting summing amplifiers 34a, 34b and 34c is connected to the output of the first summing means 44.

The A-C feedback to each phase-inverting A-C amplifier 34a, 34b and 34c from terminal 16 of an associated switching means 33a, 33b and 33c controls the gain of the circuit with which an associated D-C impedance 14'a, 14'b and 14'c cooperates, and the A-C feedback to each of amplifier from the output of first summing means 44 provides for failure compensation in the operative control channels in the event of one channel malfunctioning (i.e., developing an amplitude bias or open-circuit), as described in my copending application Ser. No. 198,481, filed May 29, 1962, now U.S. Patent 3,243,585. In the event that a given one of the switches 33a, 33b and 33c fails to switch (i.e., remains in one state), then the current through the associated D-C impedance 14'a, 14'b and 14'c is an A-C current at the A-C carrier frequency. In other words, the associated low-frequency or D-C actuated element would not, in such event, be actuated.

A further summing input of each of summing amplifiers 34a, 34b and 34c is coupled to the output of a mutually exclusive one of a plurality of a A-C position pickoffs 46a, 46b and 46c mounted on electrohydraulic actuator 43, for providing position feedback signals, in controlling actuator 43, as is understood in the feedback control art. The construction and arrangement of such transducers is also described in the above cited U.S. application Ser. No. 399,454 filed by Clarence W. Asche, now U.S. Patent 3,279,323.

Where commercially available dual pilot stage electrohydraulic valves 51a including 51b (and associated jet pipe amplifiers) are employed with the actuator of FIG. 10, a degree of reliability improvement or redundancy, alternative to the method technique described in the above mentioned U.S. application Ser. No. 399,454 filed by Clarence W. Asche (now U.S. Patent 3,279,323), may be affected by providing a like plurality of control windings, in each of the two pilot stage valves, as synchronous switches 33a, 33b and 33c and then connecting each winding of each valve in series with a corresponding winding of the other valve to provide the plurality of impedances 14'a, 14'b and 14'c which cooperate with a mutually exclusive one of synchronous switches 33a, 33b and 33c.

By means of such an arrangement for the dual pilot stage electrohydraulic valves, the D-C excitation of any one-control winding of a given pilot stage valve will actuate such valve, even though the other windings thereof fail or are not excited. Further, the failure of a given winding in one valve will cause a failure of the corresponding series-connected winding of the other valve, whereby the valve spool forces, resulting from opposing valves, are always synchronized.

Thus, it is to be appreciated that the arrangement of FIG. 10 provides a highly reliable and effective means for control of a D-C actuated member in an A-C control loop.

Accordingly, there has been described synchronous switching means for cooperation with a modulated square wave carrier and a load impedance. In the cooperation of such structural arrangement, the load impedance presents a selected transfer function to the modulated A-C signal corresponding to that presented to the modulation envelope. Further, a D-C or low frequency actuated load impedance can be conveniently actuated or controlled in response to the modulation envelope of such A-C carrier. Moreover, a plurality of such structural combinations can be made to conveniently cooperate in a closed loop redundant arrangement to achieve a more highly reliable configuration.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A synchronous demodulating system comprising: a source of a square wave carrier; means for modulating said square wave carrier; and a first, second, third and fourth electronic switching valve, each having a first and second conductive electrode and a third control electrode, said first electrodes of said first and second valves being commonly connected to form a first armature, said first electrodes of said third and fourth valves being commonly connected to form a second armature, said armatures being connected in series with the output of said modulation means by carrier frequency utilization impedance, said second electrodes of said first and third valve being commonly connected and said second electrodes of said second and fourth valves being commonly connected to form respective first and second switching terminals connected across impedance means responsive to the modulation envelope of said modulated carrier, said third electrodes of said first and fourth valves being interconnected and said third electrodes of said second and third valves being interconnected to form separate terminals of two-terminal switch actuation means connected to said square wave carrier source for switching said synchronous demodulation means alternately from one to the other of two switching states in synchronism with changes in the sense of said square wave carrier.

2. Apparatus for shaping the modulation envelope of an amplitude modulated alternating current carrier, comprising, an amplifier having a first input coupled to an output of means for modulating a square wave carrier, a first, second, third and fourth electronic switching valve, each having a first and second conductive electrode and a switching control electrode, like first electrodes of said first and second valves being interconnected and corresponding first electrodes of said third and fourth valves being interconnected to form respective first and second input terminals interposed in series circuit between the output of said modulating means and said first input of said amplifier, like second electrodes of said first and third valves being interconnected and corresponding second electrodes of said second and fourth valves being interconnected to form first and second output terminals connected across a signal shaping impedance, and said control electrodes of said first and fourth valves being interconnected and said control electrodes of said second and third valves being interconnected to form respective first and second switching control terminals connected across a center tapped source of said square wave carrier.

3. Apparatus for preselectively shaping the modulation envelope of a modulated alternating current carrier, comprising, a phase inverting summing amplifier, having a first input connected to a source of a modulated square wave carrier, and double-pole, double-throw synchronous switching means having cross-connected switching terminals connected across a signal shaping impedance, and further having armature terminals connected across an output and a second input to said summing amplifier, and switching control means responsive to the half cycle periodicity of said square wave carrier for switching said switching means in synchronism therewith.

4. Means for shaping the modulation envelope of an amplitude modulated alternating current carrier comprising, a phase-inverting summing amplifier having a first input connected to a source of a modulated square wave carrier; and a first, second, third and fourth electronic switching valve, each having first and second conductive electrodes and a switching control electrode;

like first electrodes of said first and second valves being interconnected and like first electrodes of said third and fourth valves being interconnected to form respective first and second input terminals connected across an output and a second input respectively of said summing amplifier;

like second electrodes of said first and third valves being interconnected and corresponding second electrodes of said second and fourth valves being interconnected to form respective first and second output terminals connected to a signal shaping impedance;

said control electrodes of said first and fourth valves being interconnected and said control electrodes of said second and third valves being interconnected to form respective first and second switching control terminals connected across a source of said alternating current carrier.

5. In a direct current actuated means having a plurality of at least three direct-current input impedances and arranged for being actuated by the excitation of at least one of said input impedances, the combination comprising first signal summing means;

a like plurality of phase inverting signal summing means as said input impedances, a first input of each said summing means being commonly connected to form a common input terminal, a like plurality of synchronous demodulating means as said phase inverting means comprising double-pole double-throw switching means having cross-connected switching terminals connected across a mutually exclusive one of said input impedances, a first switched armature terminal of each said switching means being connected to an output of a mutually exclusive one of said inverting means and a second switched armature terminal of each said switching means being connected to a mutually exclusive input of said summing means and to a second input of an associated one of said phase inverting means, a third input of each of said phase inverting means being commonly connected to an output of said summing means.

6. The device of claim 5 in which there is further provided an hydraulic motor;

a plurality of electrohydraulic transfer valves in fluid circuit with said motor for fluid control thereof, each valve having a like number of actuating circuits as said plurality of phase inverting signal summing means circuit of each of said valves being commonly connected in series;

each said series circuit comprising a mutually exclusive one of said input impedances; and a like plurality of alternating current excited position pick-off means as said phase inverting means, and mounted on said hydraulic motor for providing position feedback signals indicative of mechanical output motion of said motor, a fourth input of each of said phase inverting means being responsive to a mutually exclusive one of said position feedback signals.

7. In a direct current actuated means having a plurality of at least three direct-current input impedances arranged for being commonly actuated by the direct current excitation of at least one of said input impedances, first signal summing means, a like plurality of phase inverting alternating current signal summing means as said input impedances, a first input of each said summing means having commonly connected to form a common input terminal, a like plurality of synchronous demodulating means as said phase inverting means comprising double-pole, double-throw switching means having cross-connected switching terminals connected across a mutually exclusive one of said direct current input impedances, a first switched armature terminal of each said switching means being connected to an output of a mutually exclusive one of said inverting means and a second switched armature terminal of each said switching means being connected to a mutually exclusive input of said summing means, a second input of each of said phase inverting means being commonly connected to an output of said summing means.

8. The device of claim 7 in which there is further provided an hydraulic motor, a plurality of electrohydraulic transfer valves each valve having a like number of actuating circuits as said plurality of phase-inverting alternating current signal summing means, a circuit of each of said valves being commonly connected in series, each said series circuit comprising a mutually exclusive one of said direct current impedances, a like plurality of alternating current excited position pick-off means as said phase invention means, and mounted on said hydraulic motor for providing position feedback signals indicative of mechanical output motion of said motor, a third input of each of said phase inverting means being responsive to a mutually exclusive one of said position feedback signals.

References Cited

UNITED STATES PATENTS

| | | | |
|---|---|---|---|
| 2,961,610 | 11/1960 | Hosenthien | 328—133 X |
| 3,075,150 | 1/1963 | Berman et al. | 329—50 |
| 3,184,608 | 5/1965 | Goldfarb | 328—133 X |
| 3,243,707 | 3/1966 | Corttrell | 328—134 |

ALFRED L. BRODY, *Primary Examiner.*

U.S. Cl. X.R.

332—43; 328—133; 307—232; 330—9; 91—20; 73—517